United States Patent

Engelskirchen et al.

[11] Patent Number: 5,959,101
[45] Date of Patent: Sep. 28, 1999

[54] PRODUCTION OF POLYSACCHARIDE-BASED POLYCARBOXYLATES

[75] Inventors: Konrad Engelskirchen, Meerbusch; Herbert Fischer, Dusseldorf, both of Germany

[73] Assignee: Henkel Kommanditgesellschaft auf Aktien, Duesseldorf, Germany

[21] Appl. No.: 08/564,117

[22] PCT Filed: May 17, 1994

[86] PCT No.: PCT/EP94/01599

§ 371 Date: Mar. 18, 1997

§ 102(e) Date: Mar. 18, 1997

[87] PCT Pub. No.: WO94/28030

PCT Pub. Date: Dec. 8, 1994

[30] Foreign Application Priority Data

May 26, 1993 [DE] Germany ............... 43 17 519

[51] Int. Cl.[6] ............ C08B 15/04; C11D 3/22; C11D 1/08

[52] U.S. Cl. ............. 536/124; 510/245; 510/471; 536/123.1

[58] Field of Search ............. 536/123.1, 123.12, 536/124, 105; 510/108, 245, 254, 276, 470, 471, 473, 474

[56] References Cited

U.S. PATENT DOCUMENTS

| 3,740,339 | 6/1973 | MacDonald | 252/135 |
|---|---|---|---|
| 3,790,561 | 2/1974 | MacDonald | 260/212 |
| 4,056,400 | 11/1977 | Diamantoglou et al. | 106/162 |
| 4,689,322 | 8/1987 | Kulbe et al. | 514/54 |
| 5,541,316 | 7/1996 | Engelskirchen et al. | 510/471 |
| 5,565,556 | 10/1996 | Heinzman et al. | 536/105 |

FOREIGN PATENT DOCUMENTS

| 425369 | 10/1990 | European Pat. Off. |
|---|---|---|
| 2412837 | 10/1974 | Germany . |
| 245823 | 5/1987 | Germany . |
| 69883 | 4/1952 | Netherlands . |
| 78087 | 5/1955 | Netherlands . |
| 7002500 | 2/1970 | Netherlands . |

OTHER PUBLICATIONS

Pigman and Goepp, Jr. (Editors) *Chemistry of the Carbohydrates*, Academic Press, pp. 332–335. 1948.

Houben–Weyl "Methoden der organischen Chemie", Thieme–Verlag, Stuttgart (1987), vol. E 20, Makromolekulare Stoffe, Sub–chapter "Poly–saccharid–Derivate" by Dr. K. Engelkrichen, Loc. cit., pp. 2042 et seq., more particularly pp. 2124 et seq. (oxidized products of cellulose) and pp. 2166 et seq. (oxidation starches).

"Cellulose Chemistry and its Applications" (1983), John Wiley & Sons, Chichester GB, T.P. Nevell, "Oxidation of Cellulose" (Chapter 10) (loc. cit. pp. 262 to 265).

*Primary Examiner*—Marian C. Knode
*Assistant Examiner*—Howard C. Lee
*Attorney, Agent, or Firm*—Wayne C. Jaeschke; John E. Drach; Steven J. Trzaska

[57] ABSTRACT

A continuous process for the production of polycarboxylic acids or salts thereof from polysaccharides involving contacting a polysaccharide with an oxidizing agent selected from the group consisting of nitrogen dioxide, dinitrogen tetroxide, or an equilibrium mixture thereof in the absence of oxygen at a temperature above 80 °C. and at a pressure of from about 3 bar to about 15 bar absolute and for a tirne period of from about 1 to about 30 minutes to form a reducd gaseous product and a polysaccharide product wherein the primary alcohol groups of said polysaccharide product are at least partially converted to carboxyl groups.

32 Claims, 1 Drawing Sheet

PRODUCTION OF POLYSACCHARIDE-BASED POLYCARBOXYLATES

BACKGROUND OF THE INVENTION

1. Field of the Invention

This invention relates to a process for the production of polycarboxylates by selective oxidation of polysaccharides with nitrogen dioxide.

2. Statement of Related Art

The production of polycarboxylates by oxidative treatment of polysaccharides, for example cellulose, starch and dextrins, is described in detail in the literature, cf. for example Houben-Weyl "Methoden der organischen Chemie", Thieme-Verlag, Stuttgart (1987), Vol. E 20, Makromolekulare Stoffe, Sub-chapter "Poly-saccharid-Derivate" by Dr. K. Engelskirchen, loc. cit., pages 2042 et seq., more particularly pages 2124 et seg. (oxidation products of cellulose) and pages 2166 et seg. (oxidized starches). Information on production processes can also be found in the publication "Cellulose Chemistry and its Applications" (1983), John Wiley & Sons, Chichester, GB, cf. in particular T. P. Nevell, "Oxidation of Cellulose" (Chapter 10) and the literature cited therein (loc. cit. pages 262 to 265).

Various oxidizing agents are used for the oxidation of polysaccharides, more particularly polyglucosans synthesized solely from glucose, and include for example (atmospheric) oxygen, hydrogen peroxide, sodium hypochlorite or bromite, periodic acid and periodates, lead (IV) acetate, nitrogen dioxide and cerium(IV) salts. The oxidizing agents react very differently with the anhydroglucose units, cf. for example the formula schemes in Houben-Weyl, loc. cit. page 2124. Thus, periodates and lead(IV) acetate promote C-C-opening of the anhydroglucose rings. So-called 2,3-dialdehyde cellulose is obtained from cellulose, dialdehyde starch being analogously obtained from starch. Where cellulose is exposed to the action of nitrogen dioxide, the oxidation of the primary alcohol group to the carboxyl group is predominant. The oxidizing agent, which is generally present in equilibrium with dinitrogen tetroxide, may be used in gaseous formed or as a solution in an inert organic solvent, cf. also Houben-Weyl, loc. cit. page 2125 and the primary literature cited in this regard therein. Substantially selective oxidations of the primary alcohol group of the anhydroglucose units to the carboxyl group can also be carried out correspondingly starting out from starch. Thus, the oxidation of starch with gaseous nitrogen dioxide or nitrogen dioxide dissolved in water or in various organic solvents at normal temperature and pressure is known from U.S. Pat. No. 2,472,590. In this case, the reaction temperature is relatively low.

Under these conditions, the substantially complete conversion of the primary alcohol groups of the polysaccharides into carboxyl groups is only achieved after very long reaction times of, in some cases, several days. In addition, large amounts of nitrogen dioxide, based on polysaccharide to be oxidized, are required in the known processes. The long reaction times are an obstacle to continuous operation and, in practice, only allow discontinuous operation with relatively small quantities of reactants. Another problem is the exothermic nature of the reaction.

The present invention seeks to improve the production of such oxidation products of polysaccharides in order to enable relatively large quantities to be economically produced and hence to secure their availability. This is because the polycarboxylates formed are potential builders or co-builders for detergents and cleaning compositions. The same also applies to the salts of such polycarboxylates, more particularly their water-soluble salts. The use of oxidized polysaccharide compounds to boost the cleaning performance of detergents and/or cleaning products has been known per se for decades and has been repeatedly investigated (cf. for example Dutch patents NL 69 883 and NL 78 087). The replacement of phosphate-based builder systems by 6-carboxycellulose treated with Lewis acids is described in U.S. Pat. No. 3,740,339 and in U.S. Pat. No. 3,790,561. The use of oxidized polysaccharide derivatives as a builder system for boosting detergency, particularly in laundry detergents, is also proposed in Dutch patent application NL 70/02 500. In this case, however, the derivatives in question are not derivatives selectively oxidized at the $C_6$ atom, but rather oxidation products formed by splitting of the anhydroglucose units between $C_2$ and $C_3$. Finally, European patent application EP 425 369 describes surfactant-containing mixtures for the washing of laundry which contain a builder system of conventional phosphate compounds, zeolite and oxidation products of cellulose, starch or glucose sirup. There are no reproducible particulars in this document relating to the preparation of the oxidized saccharide compounds described therein. In addition, stabilization of the polysaccharide oxidates initially formed by catalytic hydrogenation is said to be desirable.

DESCRIPTION OF THE INVENTION

Figure 1:
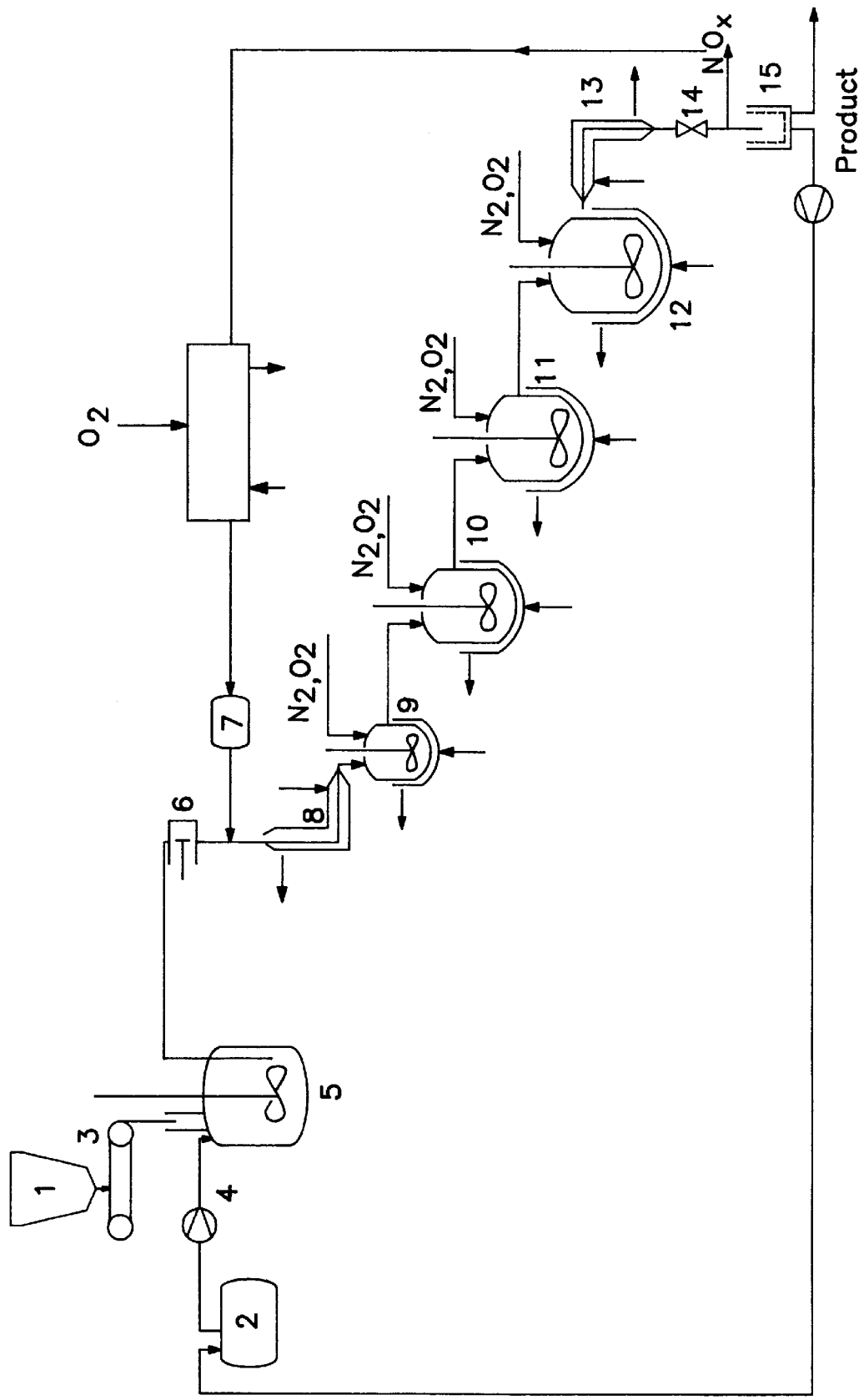
FIG. 1 is a process flow diagram depicting a cascade of stirred tank reactors.

The teaching according to the present invention is based on the surprising observation that polycarboxylates can be inexpensively obtained in high yields on a relatively large industrial scale by a simple process providing the oxidation reaction is carried out continuously with nitrogen dioxide/dinitrogen tetroxide at temperatures above 80° C. and over residence times of 1 to 30 minutes, preferably 5 to 30 minutes and more preferably 10 to 30 minutes. At these temperatures, the oxidation reaction takes place sufficiently quickly for continuous processes. Surprisingly, the high temperatures do not adversely affect the degrees of oxidation of the polysaccharides or the properties of their carboxyl derivatives, more particularly their viscosity numbers. The expression "nitrogen dioxide/dinitrogen tetroxide" stands for the equilibrium mixture of nitrogen dioxide and its dimer, dinitrogen tetroxide, which is present under the particular reaction conditions.

Accordingly, the present invention relates to a process for the production of polycarboxylic acids or salts thereof from polysaccharides by oxidation with nitrogen dioxide/dinitrogen tetroxide with at least partial conversion of the primary alcohol groups of the polysaccharides into carboxyl groups and, optionally, at least partial neutralization of the carboxylic acid groups formed, the oxidation reaction being carried out continuously at a temperature above 80° C. and over a residence time of the reaction mixture in the reaction zone of 1 to 30 minutes, preferably 5 to 30 minutes and more preferably 10 to 30 minutes. Alternatively, the process may be carried out in the presence or absence of oxygen as a co-oxidant.

The oxidation reaction is generally carried out at a temperature below about 160° C., preferably at temperatures of 100 to 140° C., more preferably at temperatures of 100 to 130° C. and most preferably at temperatures of 110 to 120° C. Particularly good results are obtained where the oxidation is carried out in a closed reaction system under pressures of 1 bar to 40 bar absolute and, more particularly, 3 bar to 15 bar absolute, as measured at the reaction temperature. Where the oxidation is carried out in the absence of oxygen, nitrogen dioxide/dinitrogen tetroxide is preferably used in such quantities that, where the equilibrium is theoretically completely displaced onto the side of the nitrogen dioxide, the nitrogen dioxide is present in quantities of 0.1 to 3 mole equivalents and, more particularly, 0.3 to 2 mole equivalents, based on the monomer unit of the polysaccharide containing a primary alcohol group. If the oxidation is carried out in the presence of oxygen, it is proposed that the nitrogen dioxide/dinitrogen tetroxide be used in such quantities that, where the equilibrium is theoretically completely displaced onto the side of the nitrogen dioxide, the nitrogen dioxide is present in quantities of at most 2 mole equivalents and, more particularly, 0.1 to 1 mole equivalent, based on the monomer unit of the polysaccharide containing a primary alcohol group. The preferred pressures mentioned for the reaction system are established where nitrogen dioxide is used on its own, i.e. in the absence of oxygen, under the reaction conditions and, where oxygen is used as co-oxidant, are established by the introduction under pressure of gaseous oxygen or of a mixture of gaseous oxygen with a gas that is inert under the reaction conditions. Where oxygen is used as a co-oxidant, a pressure of up to 10 bar is preferably established, a pressure of 3 to 6 bar being preferred. The introduction of gaseous oxygen under pressure may be repeated several times, if desired continuously, during the reaction. It is mentioned as a particular advantage that the oxidation reaction can be controlled as a function of temperature or pressure through the oxygen dosage. The addition of oxygen is preferably controlled in such a way that the reaction temperature remains in the above-mentioned range of 100 to 160° C. Throughout the oxidation reaction, which is best carried out with intensive mixing of the reactants, the reaction temperature can generally be maintained solely by the addition of oxygen, i.e. without external heating.

Suitable inert gases, i.e. gases which do not react under the particular process conditions required, include noble gases, such as helium or argon, and carbon dioxide, but especially nitrogen and also mixtures of such gases. The oxygen content in the gas mixture is preferably from 1% by volume to 30% by volume and, more preferably, from 3% by volume to 10% by volume. In one preferred embodiment of the process according to the invention, oxygen is supplied by the introduction under pressure of air, more particularly synthesis air.

Alternatively, the polysaccharides may be oxidized by the suspension process in which they are used in the form of a suspension in a liquid which is substantially inert under the reaction conditions or the oxidation may be carried out as a gas/solid reaction with powder-form polysaccharide.

Where oxidation is carried out by the suspension process, suitable suspending agents for the polysaccharide are organic liquids which, on the one hand, effectively dissolve nitrogen dioxide/dinitrogen tetroxide and oxygen and which, on the other hand, are largely inert to them under the reaction conditions. Useful suspending agents are hydrocarbons and, above all, halogenated hydrocarbons, more particularly carbon tetrachloride. The quantities of suspending agent used may be widely varied without any significant effect on the oxidation result. In general, the ratio by weight of suspending agent to polysaccharide is in the range from 3:1 to 8:1. After passing through the reaction zone, the suspending agent is separated from the oxidized polysaccharide by simple filtration or centrifugation, optionally after removal of the excess pressure. The suspending agent may be returned to the mixing stage either directly or if desired after working up. The oxidation product is optionally washed with an organic solvent and/or water or mixtures thereof and dried. The drying step after washing with water may be left out if the polycarboxylate obtained is to be subsequently processed to water-containing liquid or paste-form products.

The reaction may be carried out in standard reactors for gas/liquid reactions and also in continuous or on-line mixers. Thus, suitable reactors are tube reactors with static mixers arranged therein, cascades of stirred tank reactors comprising at least two stages and stirred columns divided into at least two compartments. Where a cascade of stirred tank reactors is used, temperature and pressure may be separately established in each individual reactor. However, a column divided into compartments may also be used as the reactor. This embodiment—which is equivalent to the cascade—may be more economical under certain conditions. By dividing up the column into compartments, individual sections can be separately cooled and heated as in the case of the cascade. Not only the suspension liquid—as mentioned above—but also the gas mixture containing nitrogen dioxide/dinitrogen tetroxide can be recirculated.

The pipes through which the suspension flows are selected according to the criteria that, on the one hand, the rate of flow of the suspension should be at least three times as high as the rate of descent of the particles and, on the other hand, the specific pressure loss should be minimal or close to the minimum. Providing these basic principles are observed, uninterrupted transport is possible throughout the entire system.

However, derivatization of the polysaccharides may also be carried out in the absence of a solvent or suspending agent. In this case, the oxidizing agents (nitrogen dioxide with—optionally—oxygen) act directly as gaseous reactants on the solid, intensively mixed substrates. In another embodiment of the invention, therefore, powder-form polysaccharide is used in the absence of a suspending agent or solvent and the reaction is carried out in a gas/solid reactor. The reaction may be carried out in a loose-bed reactor, more particularly in a rotating tube furnace. The reaction may also be carried out in a fluidized bed reactor. Alternatively, the reaction may be carried out in a continuous mixer or online mixer. A vibrating chute may also be used.

Where starch in particular is used as the polysaccharide (starch in its native state tending to agglomerate and to form channels in a fluidized bed reactor), its flow behavior can be significantly improved by additions of additives, including inter alia magnesium oxide, calcium fluoride, calcium phosphate or silica gel, more particularly highly disperse pyrogenic silica, for example Aerosil® (a product of Degussa). The tendency of starch to agglomerate is greatly reduced even by the addition of small quantities, for example 0.1 to 5% by weight and, more particularly, 0.25 to 1% by weight, of the additives. Correspondingly treated starches show liquid-like behavior in regard to their mixing properties. In this dry oxidation process, the reaction mixture can be directly taken up in water after the reaction, purified by washing with water and filtration and isolated. A considerable proportion of the nitrogen oxides present at the end of the reaction zone can be removed by simple degassing processes. Thus, even a simple vacuum treatment of the reaction mixture leads to products with low nitrite and nitrate contents. It is also of advantage to recycle the gas phase at the end of the reaction zone after cooling and—where oxidation of the polysaccharide is carried out in the absence of oxygen—oxidation of the main reduction product nitrogen monoxide to nitrogen dioxide. The nitrogen oxides can thus be recirculated in a closed system, optionally together with oxygen and the inert gases.

The nature of the polysaccharide used is largely non-critical in the process according to the invention. The only requirement is that it should contain carbohydrate units containing primary alcohol groups. Suitable polysaccharides are any native polyglucosans, more particularly starch and/or cellulose, and other polysaccharides, for example polygalactomannans, such as guaran and carubin. The polysaccharides may also be used in chemically or physically modified form where they still contain oxidizable primary alcohol groups. For economic reasons, starches differing in their provenance, more particularly potato starch, wheat starch, cornstarch or tapioca starch, are preferred. The polysaccharide used preferably contains no more than 20% by weight and, more particularly, 4% by weight to 10% by weight of water.

The oxidation reaction of the process according to the invention is carried out using the polyglucosans mentioned with—in particular—such residence times that, on a statistical average, at least 15 mole-%, preferably at least 25 mole-% and, more preferably, at least 35 mole-% to 40 mole-% of the oxidation product consists of oxidized anhydroglucose units corresponding to formula I:

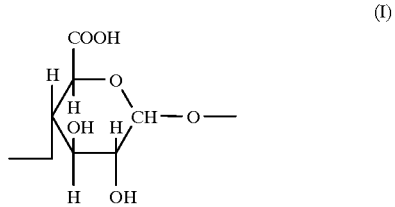

which corresponds to a carboxyl group content of at least 4% by weight, another advantage being that no significant quantities of other secondary oxidation products are present. The oxidation product thus preferably has a content of oxidized anhydroglucose units corresponding to formula I of up to about 100 mole-% and, more particularly, in the range from about 70 mole-% to 95 mole-%.

Working up of the polycarboxylates obtained where the reaction is carried out continuously, for example purification of the crude products by washing with water, can be carried out by standard methods described for discontinuous processes.

Washing may be carried out discontinuously by suspending the crude polycarboxylates—optionally after removal of the suspending agent used by filtration, centrifugation or distillation—in water in a stirred vessel. The polysaccharide derivatives can be isolated from the resulting suspension by filtration or centrifugation.

Continuous working-up methods are of course particularly advantageous for the claimed process. In these methods, the reaction product is taken up in water after leaving the reactor and separation of a suspending agent and is delivered to continuously operated filters or centrifuges where it may optionally be rewashed with water.

The purified, water-containing polycarboxylates are dried either directly or after the removal of water by treatment with a water-miscible solvent. As described in the following, the purified moist products may even be converted into the salt form and dissolved.

Thus, after the oxidation reaction and the optional working-up step described above, the carboxyl groups of the oxidation product may be at least partly neutralized by treatment with a basic reagent, i.e. converted from the acid into the salt form. Preferably, the neutralization step is also carried out continuously. The neutralizing agent used is preferably an aqueous solution containing basic alkali metal compound, more particularly alkali metal hydroxide, alkali metal carbonate, alkali metal hydrogen carbonate, and/or ammonium hydroxide and/or organic base. An alkali metal hydroxide, more particularly sodium hydroxide, sodium hydrogen carbonate or sodium carbonate, is preferably used. Neutralization may also be carried out immediately after the oxidation reaction, for example by treating the crude product with gaseous ammonia. Salt formation may even be carried out under reducing conditions, for example using sodium borohydride. The neutralizing agent is preferably used in such quantities that all the carboxyl groups of the oxidation product are converted into the salt form. The oxidation product may be added to the neutralizing agent or the neutralizing agent may be added to the oxidation product. Salt formation may even be carried out in the practical application or subsequent processing of the polycarboxylates present in acid form, for example in the production or use of detergents or cleaning products, by typical alkaline constituents of such products.

The polycarboxylates produced by the process according to the invention are preferably used as builders or co-builders in detergents or cleaning compositions. In such detergents or cleaning compositions, they are preferably used as co-builders in quantities of 0.5% by weight to 10% by weight and, more particularly, in quantities of 2% by weight to 7% by weight, based on the total weight of the detergent or cleaning composition containing inorganic water-insoluble primary builders. In a particularly preferred embodiment, they are used in detergents or cleaning compositions containing zeolite NaA of the type described, for example, in German patent DE 24 12 837 in connection with laundry detergents as primary builder and polycarboxylic acids produced in accordance with the invention or salts thereof in quantity ratios of 2:1 to 5:1. The composition of the detergent and/or cleaning compositions may otherwise be selected as required within the limits of known formulations.

In addition, the polycarboxylic acids produced in accordance with the invention are suitable for use in dishwashing detergents. In addition to surfactants, machine dishwashing detergents of the latest phosphate-free generation contain oxygen-based oxidizing agents and a relatively complex builder combination of alkali metal carbonates and organic complexing agents. The organic complexing agents hitherto used include organophosphonic acids, hydroxycarboxylic acids, aminocarboxylic acids and, in particular, polymeric polycarboxylic acids which are often used in admixture with low molecular weight polyhydroxypolycarboxylic acids, for example citric acid, or water-soluble salts thereof. In addition, alkali metal silicate is generally present as a further builder component. Dishwashing detergents with this composition often have the disadvantage of forming lime deposits both in the dishwashing machine used and, in particular, on the washed contents thereof, particularly where relatively hard water is used. The coatings formed by the dishwashing detergent in conjunction with the hardness constituents of the water can be inhibited by the use of a builder combination containing certain oxidation products of polyglucosans. In another advantageous embodiment of the invention, therefore, the polycarboxylic acids produced by the process described above or salts thereof are used as builders or as part of a builder composition in dishwashing detergents intended in particular for dishwashing machines.

In addition, the polycarboxylates produced by the process according to the invention are eminently for suitable for use as incrustation inhibitors against lime deposits in water-carrying pipes and apparatus, for example in cooling water systems.

The polycarboxylates may also be used with advantage as auxiliaries in ceramic compositions for improving their plastic forming properties.

The claimed process is illustrated by the following Examples relating to the $NO_2$ oxidation of starch by the suspension process in conjunction with the accompanying drawing.

EXAMPLES

Example 1

Example 1 describes the oxidation of starch in the cascade of stirred tank reactors illustrated in FIG. 1. The cascade consists of four individual stirred tank reactors which are designed in such a way that the useful volume of the following tank reactor is twice that of the preceding tank reactor. The overall useful volume is of the order of 250 l.

Each tank reactor is equipped with a separately driven stirrer system with speed control and with a separately controllable jacket cooling and heating system.

120 kg/h of starch with a water content of around 4% by weight were delivered to the mixing vessel 5 from tank 1 via a weighing belt 2 while 956 kg/h of carbon tetrachloride were continuously delivered to the mixing vessel 5 from tank 2 via a metering pump 4. The resulting starch suspension was continuously removed in a quantity of around 1076 kg/h through another metering pump 6 and introduced via a heating zone 8 into the cascade consisting of the stirred tank reactors 9 and 12.

Before entering the heating zone, 65.4 kg/h of liquid dinitrogen tetroxide were added to the suspension from the vessel 7.

At the end of the heating zone, the reaction mixture had reached a temperature of around 90° C. It then entered the stirred tank reactors 9 to 12 in which it was heated to temperatures of around 95° C. (stirred tank reactor 9), 105° C. (stirred tank reactor 10), 115° C. (stirred tank reactor 11) and 125° C. (stirred tank reactor 12).

A pressure of around 15 bar was established in the cascade of stirred tank reactors.

After leaving the stirred tank reactor 12, the reaction mixture entered the cooling zone 13 in which it was cooled to around 65 to 70° C. It was then relieved of pressure through the valve 14. The nitrous gases escaping were oxidized in the presence of air and returned to the storage vessel 7 for dinitrogen tetroxide.

The reaction mixture was then delivered to a continuously operating centrifuge 15. Most of the carbon tetrachloride was removed by centrifugation and, after extraction with water, was returned to the storage tank 2.

The solvent adhering to the solid was evaporated off in vacuo, condensed and optionally returned to the storage tank 2.

The crude carboxyl starch was washed with water and then dried to a residual moisture content of around 6% by weight.

A white product with an acid value of around 290, corresponding to an average content of around 0.9 carboxyl groups per anhydroglucose unit, was obtained.

To determine the acid value, around 0.5 g to 0.75 g of the carboxyl starch was suspended in 50 ml of demineralized water. 10 ml of 0.5 N alcoholic potassium hydroxide solution were added to the resulting suspension which was then stirred for 30 minutes at room temperature, the starch derivative passing into solution. Excess potassium hydroxide was back-titrated with 0.5 N aqueous hydrochloric acid against phenolphthalein as indicator.

Example 2

Example 1 was repeated with the difference that 32.7 kg/h of liquefied dinitrogen tetroxide were added to the starch suspension before it entered the heating zone and a pressure of around 6 bar absolute was established with nitrogen in the cascade of stirred tank reactors and was kept substantially constant by the subsequent introduction of oxygen.

Working up of the reaction mixture produced a carboxyl starch with an acid value of around 320 corresponding to a content of around one carboxyl group per anhydroglucose unit.

Example 3

Example 2 was repeated with the difference that the cascade of stirred tank reactors was replaced by a stirred column divided into 12 compartments.

With a length of 2.5 m and a diameter of 0.4 m, this reactor had a useful volume of around 295 l. In terms of stage efficiency, this column corresponded to a cascade arrangement with 6 to 7 individual tank reactors of equal size.

The column was blanketed with compressed air up to a pressure of around 5 bar (synthesis air). This pressure was kept constant by subsequent introduction of oxygen.

The temperature of the reaction mixture was around 95° C. at the end of the heating zone, around 105° C. in the 1st third of the column, around 120° C. in the 2nd third and around 130° C. in the 3rd third of the column. The average residence time was around 25 minutes.

Working up of the reaction mixture in the same way as described in Example 1 gave a carboxyl starch with an acid value of 310 corresponding to a content of around one carboxyl group per anhydroglucose unit.

| List of reference numerals | |
|---|---|
| 1 | Storage tank for starch |
| 2 | Storage tank for carbon tetrachloride |
| 3 | Weighing belt |
| 4 | Metering pump |
| 5 | Mixing vessel |
| 6 | Pump |
| 7 | Storage vessel for dinitrogen tetroxide |
| 8 | Heating zone |
| 9–12 | Stirred tank reactors |
| 13 | Cooling zone |
| 14 | Pressure reduction |
| 15 | Centrifuge |

What is claimed is:

1. A continuous process for the production of polycarboxylic acids or salts thereof from polysaccharides which comprises contacting a polysaccharide with an oxidizing agent selected from the group consisting of nitrogen dioxide, dinitrogen tetroxide, or an equilibrium mixture thereof in the presence or absence of oxygen at a temperature above 80° C. and at a pressure of from about 3 bar to about 15 bar absolute and for a time period of from about 1 to about 30 minutes to form a reduced gaseous product and a polysaccharide product wherein the primary alcohol groups of said polysaccharide product are at least partially converted to carboxyl groups.

2. The process of claim 1 wherein the reaction is carried out in the presence of oxygen.

3. The process of claim 1 wherein the reaction is carried out at a temperature of from about 100° C. to about 140° C.

4. The process of claim 3 wherein said temperature is from about 110° C. to about 120° C.

5. The process of claim 1 wherein said reaction time is from about 5 to about 30 minutes.

6. The process of claim 5 where said time is from about 10 to about 30 minutes.

7. The process of claim 1 wherein said oxidizing agent is nitrogen dioxide present in an amount equal to from about 0.1 to about 3 mole equivalents based on the monomer unit of the polysaccharide containing a primary alcohol group.

8. The process of claim 7 wherein the amount of said nitrogen dioxide is from about 0.3 to about 2 mole equivalents based on the monomer unit of the polysaccharide containing a primary alcohol group.

9. The process of claim 1 further comprising the step of oxidizing the nitrogen monoxide in said gaseous product to nitrogen dioxide and recycling it to the polysaccharide oxidation reaction.

10. The process of claim 2 wherein said oxidizing agent is nitrogen dioxide present in at least 2 mole equivalents based on the monomer unit of the polysaccharide containing a primary alcohol group.

11. The process of claim 10 wherein the amount of said nitrogen dioxide is from about 0.1 to about 1 mole equivalents based on the monomer unit of the polysaccharide containing a primary alcohol group.

12. The process of claim 2 wherein the pressure is kept constant by introduction of oxygen.

13. The process of claim 2 wherein the pressure is kept constant by introduction of a mixture comprised of oxygen and an inert gas selected from the group consisting of helium, argon, carbon dioxide, nitrogen and mixtures thereof wherein the oxygen content of said mixture is from about 1% to about 30% by volume.

14. The process of claim 2 wherein the pressure is kept constant by introduction of a mixture comprised of air and an inert gas selected from the group consisting of helium, argon, carbon dioxide, nitrogen and mixtures thereof wherein the oxygen content of said mixture is from about 1% to about 30% by volume.

15. The process of claim 1 wherein said polysaccharide is polygucosan and the reaction is carried for a time sufficient to produce a product comprised of at least 15 mole-% oxidation product which is comprised of up to 100 mole-% of oxidized anhydroglucose units of the formula I:

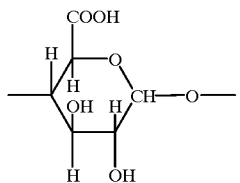

16. The process of claim 15 wherein the amount of said oxidized anhydroglucose units is from about 70 mole-% to about 95 mole-%.

17. The process of claim 1 wherein said polysaccharide is suspended in a liquid which is substantially inert under the reaction conditions.

18. The process of claim 17 wherein said liquid is a halogenated hydrocarbon.

19. The process of claim 18 wherein said halogenated hydrocarbon is carbon tetrachloride.

20. The process of claim 1 wherein said process is carried out in a tube reactor containing a static mixer, a cascade of stirred tank reactors comprising at least two stages, a continuous mixer or in a stirred column divided into at least two compartments, a loose-bed reactor, a rotating tube furnace, a fluidized bed reactor, a continuous mixer or online mixer.

21. The process of claim 1 wherein said polysaccharide is derived from potato starch, wheat starch, cornstarch, tapioca starch, cellulose or mixtures thereof.

22. The process of claim 17 further comprising the steps of removing the polysaccharide product from said liquid and washing said polysaccharide product with water.

23. The process of claim 1 further comprising the step of at least partially neutralizing said carboxyl groups by reaction with an alkali metal hydroxide, alkali metal carbonate, alkali metal hydrogen carbonate, ammonium hydroxide, organic base or a combination thereof.

24. The process of claim 2 wherein said polysaccharide is polyglucosan and the reaction is carried for a time sufficient to produce a product comprised of at least 15 mole-% oxidation product which is comprised of up to 100 mole-% of oxidized anhydroglucose units of the formula I:

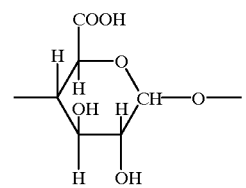

25. The process of claim 24 wherein the amount of said oxidized anhydroglucose units is from about 70 mole-% to about 95 mole-%.

26. The process of claim 1 wherein said polysaccharide is suspended in a liquid which is substantially inert under the reaction conditions.

27. The process of claim 26 wherein said liquid is a halogenated hydrocarbon.

28. The process of claim 27 wherein said halogenated hydrocarbon is carbon tetrachloride.

29. The process of claim 2 wherein said process is carried out in a tube reactor containing a static mixer, a cascade of stirred tank reactors comprising at least two stages, a continuous mixer or in a stirred column divided into at least two compartments, a loose-bed reactor, a rotating tube furnace, a fluidized bed reactor, a continuous mixer or online mixer.

30. The process of claim 2 wherein said polysaccharide is derived from potato starch, wheat starch, cornstarch, tapioca starch, cellulose or mixtures thereof.

31. The process of claim 26 further comprising the steps of removing the polysaccharide product from said liquid and washing said polysaccharide product with water.

32. The process of claim 2 further comprising the step of at least partially neutralizing said carboxyl groups by reaction with an alkali metal hydroxide, alkali metal carbonate, alkali metal hydrogen carbonate, ammonium hydroxide, organic base or a combination thereof.

* * * * *